United States Patent
Praschak

(10) Patent No.: US 7,794,564 B2
(45) Date of Patent: Sep. 14, 2010

(54) EVAPORATION SYSTEM

(75) Inventor: Herbert Praschak, Weisenbach (DE)

(73) Assignee: GEA Wiegand GmbH, Ettlingen (DE)

( * ) Notice: Subject to any disclaimer, the term of this patent is extended or adjusted under 35 U.S.C. 154(b) by 820 days.

(21) Appl. No.: 10/582,207

(22) PCT Filed: Dec. 9, 2004

(86) PCT No.: PCT/EP2004/014038

§ 371 (c)(1),
(2), (4) Date: Apr. 16, 2007

(87) PCT Pub. No.: WO2005/056152

PCT Pub. Date: Jun. 23, 2005

(65) Prior Publication Data

US 2007/0204963 A1    Sep. 6, 2007

(30) Foreign Application Priority Data

Dec. 11, 2003  (DE) ............................ 103 58 015

(51) Int. Cl.
*B01D 1/26* (2006.01)
*B01D 1/28* (2006.01)
*F22G 1/00* (2006.01)

(52) U.S. Cl. ............. 159/24.1; 159/17.1; 159/DIG. 8; 202/155; 202/174; 202/182; 203/26; 203/71; 203/100; 203/DIG. 8; 122/459

(58) Field of Classification Search ............... 159/16.3, 159/17.1, 24.1, DIG. 8; 202/155, 172, 174, 202/182; 203/24, 26, 71, 100, DIG. 8; 122/459
See application file for complete search history.

(56) References Cited

U.S. PATENT DOCUMENTS

| | | | | | |
|---|---|---|---|---|---|
| 3,763,020 A | * | 10/1973 | Drew et al. | ................... | 203/14 |
| 3,833,044 A | * | 9/1974 | Wallace | ........................ | 159/8 |
| 4,310,382 A | * | 1/1982 | Gress | ........................ | 159/16.1 |
| 4,437,316 A | * | 3/1984 | Dyer et al. | ..................... | 62/79 |
| 4,437,933 A | * | 3/1984 | Kikkawa et al. | ........... | 159/17.1 |
| 5,036,903 A | * | 8/1991 | Shook | ........................ | 165/133 |
| 5,076,895 A | * | 12/1991 | Greenfield et al. | ........... | 203/10 |
| 5,248,387 A | * | 9/1993 | Hansen | ...................... | 159/48.1 |
| 6,551,466 B1 | * | 4/2003 | Kresnyak et al. | ............... | 203/1 |

FOREIGN PATENT DOCUMENTS

DE            405912         11/1924

OTHER PUBLICATIONS

English Translation (Computer) of DE 2632910, Jan. 26, 1978.*
German Search Report dated Jul. 27, 2004.
Ullmanns Encyklopädie der technischen Chemie. 4. Aufl., Bd.2, Verlag Chemie, Weinheim/Bergstrasse, 1972, S. 661-663.

* cited by examiner

*Primary Examiner*—Virginia Manoharan
(74) *Attorney, Agent, or Firm*—Edwards Angell Palmer & Dodge LLP; Scott D. Wofsy

(57) ABSTRACT

A multistage evaporation system is proposed in which the first evaporator is heated via a jet wet washer with superheated, air-containing waste steam, for example of a drier. The product vapor of the first evaporator stage is fed via a mechanical compressor to a second evaporator stage for heating. The compressor ensures firstly a lowering of the dew point in the evaporator space of the first evaporator stage and secondly a temperature increase of the product vapor fed to the second evaporator stage for heating.

7 Claims, 1 Drawing Sheet

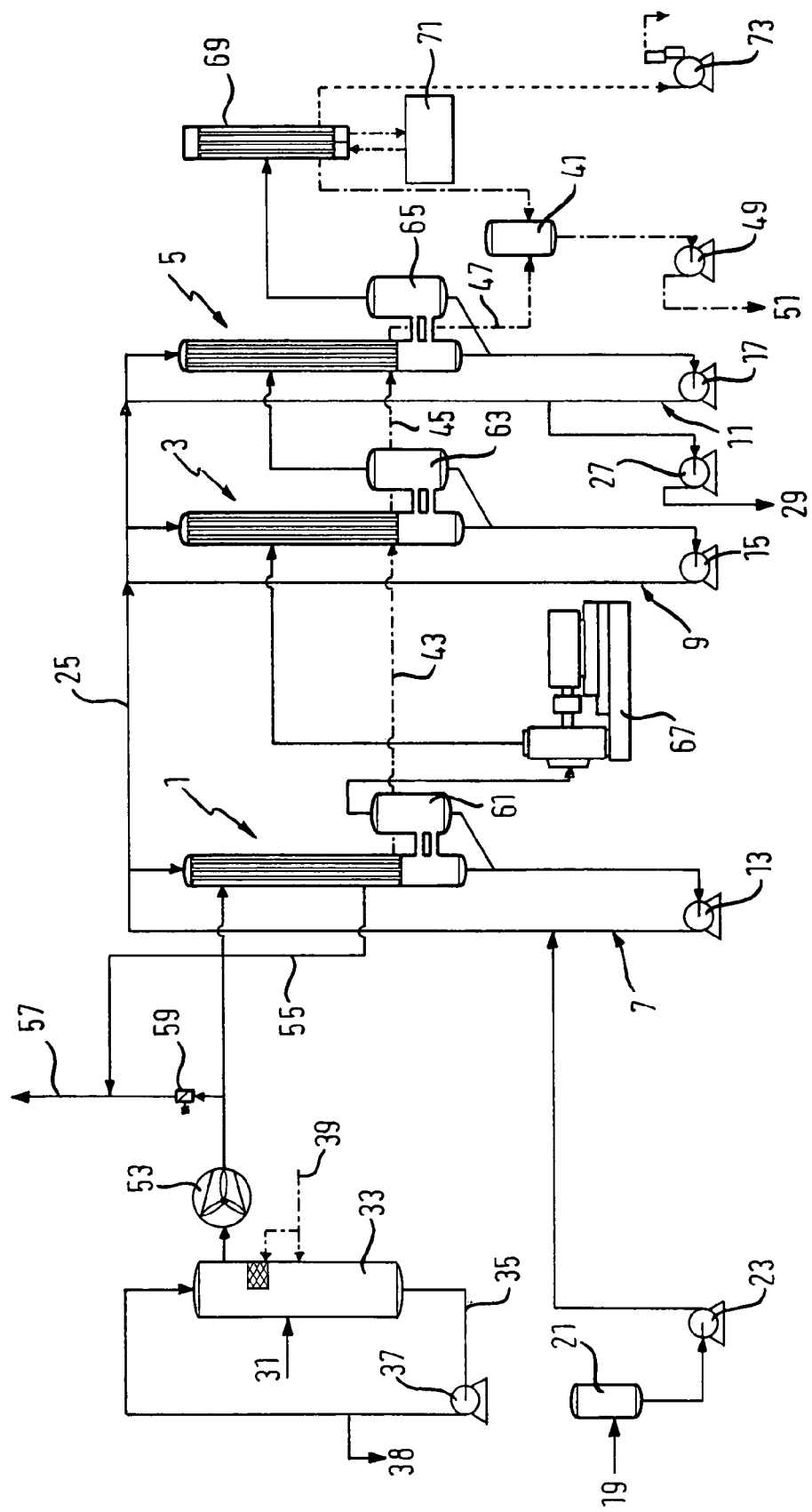

EVAPORATION SYSTEM

BACKGROUND OF THE INVENTION

1. Field of the Invention

The invention relates to an evaporation system comprising an evaporator heated by process waste steam and a process stage heated by product vapors of the evaporator, in particular at least one further evaporator.

2. Description of Related Art

In order to operate evaporation systems as economically as possible, process heat obtained otherwise, for example in the form of waste steam obtained in the process, is used for heating the evaporator or the evaporators. Such process waste steams as obtained, for example, as waste steam of drier stages can, however, be used only to a limited extent since they are obtained at relatively low pressure or are mixed with air or inert gases. The condensation capacity of the evaporators heated with such process waste steams is as a rule reduced and the number of evaporator stages heated with such process waste steams and hence the efficiency of the evaporation system are greatly limited.

In the case of multistage evaporation systems, it is furthermore known that the product vapors of an evaporator stage of the evaporation system can be compressed by a compressor to a higher pressure in order in this way to heat a further evaporator stage with the compressed product vapors. Usually, jet compressors operated with fresh steam or mechanical compressors are used for this purpose. If mechanical compressors are used, the customary pressure increases (ratio of final pressure to intake pressure) for one-stage radial fans used in practice are 1.3 and for one-stage radial compressors are 2.5. Since the increases in vapor temperature are comparatively small, the number of evaporator stages connected in series in the case of conventional, multistage evaporation systems with vapor compression is greatly limited. Products having a high boiling point shift cannot be evaporated using this process or can be evaporated only to an insufficient extent, i.e. in the low concentration range.

SUMMARY OF THE INVENTION

It is an object of the invention to provide an evaporation system which can be operated with process waste steam and has improved evaporation power.

The invention starts from an evaporation system comprising an evaporator stage heated by process waste steam and a process stage heated by product vapors of this stage, in particular at least one further evaporator, and is characterized in that a vapor compression stage is connected to the product vapor exit of the evaporator, which compression stage lowers the dew point of the evaporator below the temperature value required for heating the process stage and, by compression of the product vapor, raises the temperature of the product vapor to the temperature value required for heating the process stage.

While in conventional multistage evaporation systems an attempt is always made to operate the evaporators of the evaporation system so that, in each of the evaporators, the energy content of the waste steam used for heating or of the vapor is reduced in steps only to such an extent that the waste steam or the vapor is still at a temperature and energy level which can be used in downstream evaporators, in the evaporation system according to the invention the dew point of the first evaporator heated by the process waste steam is lowered to a value which is below the heating temperature in the downstream second evaporator. In this way, the condensation power of the first evaporator can be considerably increased, even if only process waste steam at low pressure is available for heating the first evaporator. The process waste steam cooled in the first evaporator is no longer used in the further evaporators of the evaporation system. Rather, by means of the vapor compression stage, the product vapor forming in the first evaporator is compressed and is brought to a higher temperature so that the product vapor is used for heating the second evaporator and optionally further evaporators. The vapor compression stage is dimensioned so that it simultaneously ensures lowering of the dew point of the first evaporator.

The process waste steam used for heating the first evaporator is preferably saturated process steam or saturated steam. However, the process waste steam is often not available in the form of saturated steam. In an expedient development, it is therefore intended that the saturated steam be generated from superheated process waste steam by supplying water, in particular preferably so that this process takes place without condensation. In particular, a wet washer which purifies the superheated process waste steam is suitable for the condensation-free conversion of the superheated process waste steam, for example of a drier, into saturated process steam and for the purification. For the saturation of the superheated process waste steam, fresh water, but also condensate obtained in the evaporation system, can be fed to the wet washer. The wet washer may be a jet wet washer.

Although the compression stage may also be a jet compressor operated with fresh steam, it is still preferable for the compression stage to be in the form of a mechanical vapor compression stage in order to avoid having to make additional fresh steam available for the vapor compression. The mechanical vapor compression stage may comprise one-stage or multistage fans or compressors.

BRIEF DESCRIPTION OF THE DRAWING

Below, the invention is explained in more detail with reference to a drawing. The drawing shows a schematic system diagram of a multistage evaporation system which can be heated with superheated drier waste steam to which air has been added and which originates from a drier system not shown.

DETAILED DESCRIPTION OF THE PREFERRED EMBODIMENTS

The evaporation system comprises three evaporator stages 1, 3, 5 which are each in the form of a downflow evaporator and each of which comprises a product circulation loop 7, 9 and 11 with a circulation pump 13, 15 and 17, respectively. The product to be evaporated and fed in at 19 via a buffer container 21 and a delivery pump 23 is fed into the circulation loop 7 of the first evaporator stage 1 and fed in a conventional manner via the circulation loop 7 in the upper region of the evaporator space of the evaporator stage 1. In the same way, the product to be evaporated also passes to the circulation loops 9, 11 of the evaporator stages 3, 5 via a line 25. By means of a delivery pump 27, the evaporated concentrate is removed at an outlet 29.

The heating energy required for heating the evaporator stages 1, 3 and 5 is used from a superheated steam/air mixture which originates from a drier stage not shown and is fed at 31 to a jet wet washer 33 which frees it from dust and the like in a circulation loop 35 whose circulation pump is indicated at 37 and at the same time converts the air-containing, superheated drier waste steam into saturated process steam. The sludge exit of the washer 33 is indicated at 38. The required additional water is fed to the jet wet washer 33 at 39, in particular in the form of condensate as obtained via a flash container 41 and lines 43, 45 and 47 in the evaporators 1, 3, 5. A delivery pump 49 transports the condensate to an outlet 51.

The saturated process steam is fed via a fan 53 to the heating space of the first evaporator 1 and, after leaving the heating space, passes via a line 55 to a chimney 57 which releases the cooled waste steam into the atmosphere. Excess process steam can also be fed, with control by means of a valve 59, directly to the chimney 57 in order to regulate the system performance, for example to keep the starting pressure of the fan 53 constant.

Each of the evaporator stages 1, 3 and 5 comprises, in its lower part, a separator 61, 63 and 65, respectively, which separates off product vapor liberated in the evaporator. The product vapor of the first evaporator stage 1 is fed via a mechanical compressor 67 to the heating space of the second evaporator stage 3. The compressor 67 is dimensioned so that it lowers the dew point in the evaporator space of the first evaporator 1 to a temperature which is below the dew point value required in the second evaporator 3. The mechanical compressor 67 increases the temperature of the product vapor to the heating temperature required in the second evaporator 3.

In the evaporator stages 3 and 5, the evaporation process is continued until the concentrate leaves the system via the pump 27 at the outlet 29 at the desired final density.

The remaining product vapor of the evaporator stage 5 is fed in a conventional manner to a condenser 69 whose cooling water supply is represented at 71. Condensate obtained in the condenser 69 is also fed to the collecting container 41.

73 represents a vacuum pump which ensures the reduced pressure required during operation of the process in the evaporators 1, 3, 5 and in the condenser 69.

Below, the operation of the evaporation system is to be explained in the case of the evaporation of $Na_2O$ solution as an example. Steam/air mixture superheated to 150° C., originating from a drier and having a dew point of 81° C. is fed to the entrance 31 of the jet wet washer 33. The subsequently saturated steam/air mixture is condensed in the first evaporator 1, the compressor 67 reducing the dew point of the first evaporator 1 to 65° C. in order to be able to condense a sufficient amount of steam as early as in the first evaporator stage 1. Since 65° C. is too low for the further evaporation in the evaporator stages 3 and 5, the compressor 67 increases the saturated steam temperature for heating the evaporator stages 3 and 5 to about 72° C. In the evaporator stages 3 and 5, the effective temperature difference is in each case only 2° to 3° K., the pressure in the condenser 69 being set to about 73 mbar.

The invetion claimed is:

1. An evaporation system in a processing plant processing a product and supplying process waste steam, the system comprising:
    an evaporator for concentrating the product at a given dew point temperature, the evaporator having an exit for product vapor heated by process waste steam supplied by the processing plant;
    a process stage operatively connected to the evaporator to be heated to a defined temperature by product vapors of the evaporator; and
    a vapor compression stage operatively connected to the product vapor exit of the evaporator and to the process stage, to lower the given dew point temperature of the evaporator below the defined temperature required for heating the process stage and to raise the temperature of the product vapor to the defined temperature by compressing the product vapor,
    wherein the process waste steam supplied by the processing plant is superheated process waste steam,
    wherein the system further comprises saturated process steam generating means for generating saturated process waste steam from superheated process waste steam without condensation by adding water or condensate thereto,
    wherein the saturated process steam generating means comprises a wet washer purifying the superheated process waste steam and converting the superheated process waste steam in a condensation-free manner into purified saturated process waste steam to be supplied to the evaporator, and
    wherein the system forms a process waste steam route from a drier through the wet washer, a heating space of the evaporator and a waste steam outlet line of the evaporator to a waste steam chimney and wherein a delivery pump is arranged in the process waste steam route.

2. The evaporation system as claimed in claim 1, wherein the vapor compression stage is in the form of a mechanical vapor compression stage.

3. The evaporation system as claimed in claim 1, wherein the processing stage includes at least one additional evaporator.

4. The evaporation system as claimed in claim 1, wherein the delivery pump is a fan.

5. An evaporation system in a processing plant processing a product and supplying process waste steam, the system comprising:
    an evaporator for concentrating the product at a given dew point temperature, the evaporator having an exit for product vapor heated by process waste steam supplied by the processing plant;
    a process stage operatively connected to the evaporator to be heated to a defined temperature by product vapors of the evaporator; and
    a vapor compression stage operatively connected to the product vapor exit of the evaporator and to the processss stage, to lower the given dew point temperature of the evaporator below the defined temperature required for heating the process stage and to raise the temperature of the product vapor to the defined temperature by compressing the product vapor,
    wherein the process waste steam supplied by the processing plant is superheated process waste steam,
    wherein the system further comprises saturated process steam generating means for generating saturated process waste steam from superheated process waste steam without condensation by adding water or condensate thereto,
    wherein the saturated process steam generating means comprises a wet washer purifying the superheated process waste steam and converting the superheated process waste steam in a condensation-free manner into purified saturated process waste steam to be supplied to the evaporator, and
    wherein the system includes at least one evaporator in fluid communication with the wet washer for feeding condensate of the at least one evaporator to the wet washer for the saturation and purification of the superheated process waste steam.

6. The evaporation system as claimed in claim 5, wherein the vapor compression stage is in the form of a mechanical vapor compression stage.

7. The evaporation system as claimed in claim 5, wherein the processing stage includes at least one additional evaporator.

* * * * *